United States Patent [19]

Horner

[11] 3,977,771
[45] Aug. 31, 1976

[54] OPTICAL NOISE SUPPRESSION DEVICE AND METHOD

[75] Inventor: Joseph L. Horner, Cambridge, Mass.

[73] Assignee: The United States of America as represented by the Administrator of the United States National Aeronautics and Space Administration, Washington, D.C.

[22] Filed: June 30, 1975

[21] Appl. No.: 591,568

[52] U.S. Cl. ........................................ 350/162 SF
[51] Int. Cl.² ........................................ G02B 27/38
[58] Field of Search ........................ 350/162 SF, 3.5

[56] References Cited
UNITED STATES PATENTS

| | | | |
|---|---|---|---|
| 3,482,102 | 12/1969 | Thomas | 350/162 SF |
| 3,492,635 | 1/1970 | Farr | 350/162 SF |
| 3,620,598 | 11/1971 | Brandt | 350/162 SF |
| 3,770,340 | 11/1973 | Cronin et al. | 350/162 SF |

Primary Examiner—Ronald J. Stern
Attorney, Agent, or Firm—Edward K. Fein; John R. Manning; Marvin F. Matthews

[57] ABSTRACT

Disclosed is a device and method for suppression of optical noise in an optical spatial filtering system using highly coherent light. In the disclosed embodiment, input photographic film to be processed in the system, and output photographic film to be exposed, are each mounted on lateral translation devices. During application of the coherent light for exposure of the output film, the two translation devices are moved in synchronism by a motor-driven gear and linkage assembly. The ratio of the resulting output film translation to the input film translation is equal to the magnification of the optical data processing system. The noise pattern associated with the lenses and other elements in the optical processing system remains stationary while the image-producing light moves laterally through the pattern with the output film, thus averaging out the noise effect at the output film.

23 Claims, 1 Drawing Figure

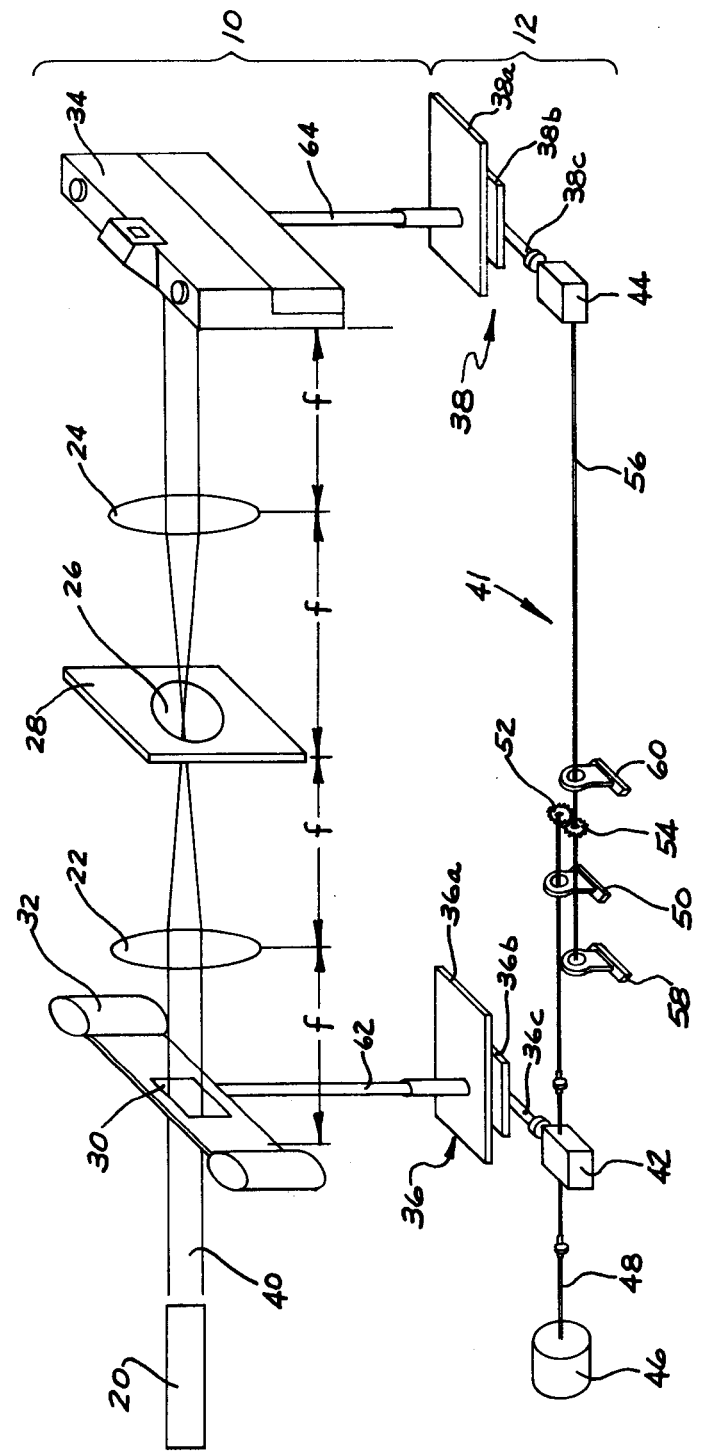
Fig.

OPTICAL NOISE SUPPRESSION DEVICE AND METHOD

ORIGIN OF THE INVENTION

The invention described herein was made by an employee of the United States Government and may be manufactured and used by or for the Government of the United States of America for Governmental purposes without the payment of any royalties thereon or therefor.

BACKGROUND OF THE INVENTION

1. Field of the Invention

The present invention pertains to the suppression of optical noise in light systems. In particular, the present invention relates to translation devices by which input and output elements in a spatial filtering system are moved synchronously along parallel paths which are perpendicular to the optic axis of the spatial filtering system. This lateral motion of the elements causes the object, the image, and the information-carrying light to move laterally relative to the optical-noise-producing sources in the system, thus averaging out the optical noise pattern and yielding a noise-free image at the output element.

2. Description of the Prior Art

Optical processing systems, particularly using highly coherent light sources, such as lasers or black-bodies, are well known. In a typical arrangement using photographic film for the input and output element, a coherent light beam passes through the input film which bears information to be processed. The light beam, impressed with the information, then passes through a Fourier transform lens in whose back focal plane is located the appropriate spatial filter to carry out the desired operation on the Fourier spectrum. The processed light beam is inverse Fourier transformed by a second lens to produce the "processed" image on the output film. The optical data processing system thus functions as an optical computer by performing mathematical operations on information transported by the light beam.

In addition to the transforming lenses and the spatial filter, other optical elements, such as lenses, are required in the optical data processing system to guide and focus the light beam. Optical noise arises from the interaction of the light beam with bulk and surface imperfections in all these optical elements. Examples of such noise-producing imperfections are bubbles, inclusions, striae and impurities in the lenses, and dust and other foreign matter on all the surfaces. Lens surfaces are also susceptible to micro-fissures produced as a result of the grinding and polishing operations in manufacturing the lenses. Such minute imperfections are usually of little or no consequence when ordinary light is used. However, when light that is highly coherent interacts with such imperfections, significant amounts of optical noise are generated.

The optical noise arises from the diffraction patterns produced in the light beam when the coherent light is incident on the imperfections. This optical noise manifests itself as a random collection of wavy lines and circles. Bulls-eye type patterns result from interference of the coherent light beam with light reflected at the interfaces of the various lens elements. These designs are registered on the film or other output device superimposed on the desired image. The term "cosmetic quality" is used to describe the extent of freedom from such noise manifestations in the image. Because of the low tolerances for error in coherent light processes such as optical data processing, optical communications, and holography, it is essential that techniques be discovered to nullify the effects of such optical noise.

Various devices and techniques have been suggested to reduce coherent optical noise. In particular, attempts have been made to nullify the noise by averaging the noise pattern at some point in the optical system to a constant background. However, efforts to develop workable and practical noise averaging systems have thus far met with only limited success.

The noise averaging method of Thomas, as described in Applied Optics 10, 517 (1968), uses a tilted optical flat in the laser beam. During the exposure of the output film this flat is rotated about the optic axis of the optical system. This rotation has the effect of rotating the individual noise sources with respect to the laser beam, and hence averaging out their noise patterns in the beam, while the desired output image is itself stationary. However, the rotating optical flat also causes the Fourier spectrum incident on the spatial filter to rotate. Consequently, the spatial filter must also be rotated, and a very accurate feedback system must be added to synchronize the motions.

The technique of Grabowsky et al, as described in Applied Optics 10, 483 (1971), uses a rotating lens, causing the noise pattern to rotate while the desired image remains stationary, thus averaging out the noise. However, to keep the image stationary, the optic axis of the rotating lens must coincide exactly with the axis of rotation. In a multiple-element lens, this condition is virtually impossible to achieve due to the unavoidable misalignment of the optic axes of the individual elements. Furthermore, in multiplelens systems, a separate rotating device is required for each lens, adding to the alignment problems.

In U.S. Pat. No. 3,729,252, Nelson proposes using $n$ separate light sources, each producing a separate noise pattern displaced from all the others in the output plane, while the desired images from all $n$ sources coincide. The effect is to reduce the signal-to-noise ratio by a factor of $1/n$. However, the $n$ light sources produce $n$ individual, displaced, and possibly overlapping Fourier transform spectra. Consequently, to carry out the desired processing, a multiple spatial filter must be employed, with the desired filter characteristics centered on each of the $n$ displaced Fourier spectra. Such a multiple spatial filter can be very difficult to fabricate if the desired filter characteristic is complicated.

SUMMARY OF THE INVENTION

The method of the present invention comprises suppressing optical noise in an optical system by moving the input and output devices in the object and image planes of the system respectively so that the desired image is always stationary with respect to the output device. During this motion, the optical noise sources in the optical system remain stationary with the remainder of the optical system elements. Consequently, the output device and the desired image move with respect to the optical noise pattern at the image plane, and the "detected" noise pattern is averaged out to a constant background. The motions of the input and output devices are perpendicular to the optic axis of the rest of the optical system. Consequently, when the method of the present invention is applied to a spatial filtering system, there is no transverse motion of the Fourier spectrum with respect to the spatial filter.

An optical noise suppression device of the present invention includes two translation tables, oriented for translational motion along parallel paths which are perpendicular to the optic axis of an optical system. The input device is mounted on one such table at the object plane of the optical system, and the output device is mounted on the other table at the image plane. A drive shaft assembly, powered by a motor, actuates the drive screws of the translation tables to move the translation tables synchronously. Gear boxes may be employed to link the drive screws to the drive shaft assembly. The drive shaft assembly includes a gear train that provides the necessary reversal and ratio characteristics of the motion of one translation table relative to the other translation table although such reversal and ratio characteristics can also be supplied by the gear boxes and/or by the drive screws, or other appropriate methods. As the input and output devices are moved by the translation tables, all other elements in the optical system remaining stationary, the optical noise pattern sweeps across the output device, averaging out the pattern "as detected" by the output device, thereby suppressing the noise effect.

The method and apparatus of the present invention are particularly useful as applied to an optical processing system employing spatial filtering, and especially where the input and output devices are photographic film or plates. In such a case, coherent light, or nearly coherent light, passes through the input transparency, and ultimately exposes the output photographic film or plate. Both input and output devices are kept in motion during the entire exposure time, which is typically a fraction of a second.

Other than the initial alignment of the apparatus, and measures to prevent backlash in the various gears and screws, the present invention entails no additional alignment requirements in the optical system itself. Since the Fourier transform of the input device does not move with respect to the optical system, the spatial filter remains stationary, and need not be specially fabricated or altered in any way.

BRIEF DESCRIPTION OF THE DRAWING

The FIGURE is a perspective view, partially schematic, of the apparatus of the present invention applied to an optical processing system including a spatial filter.

DESCRIPTION OF THE PREFERRED EMBODIMENT

The apparatus of the present invention is applied to an optical spatial filtering system in the FIG. The optical system is shown generally at 10, and the optical noise supression device is shown generally at 12. As used herein, the term "coherent", refers to spatial coherence, temporal coherence, or both spatial and temporal coherence.

The optical system shown generally at 10 includes a coherent or nearly coherent light source 20, such as a laser, a Fourier transform lens 22, an inverse Fourier transform lens 24, and a spatial filter 26, mounted in a frame 28. All of the elements may be aligned and mounted on an optical bench or other appropriate equipment (not shown).

The input device is a photographic film 30 in a film holder 32. The output device is also photographic film (not shown) mounted in a lensless camera body 34. The input 32 and output 34 film holding devices are mounted on translation tables shown generally at 36 and 38 respectively, and discussed in detail hereinafter.

The optical system at 10 is a standard afocal coherent optical spatial filtering system with an overall image magnification M of unity, and is well known in the art. The schematically represented light beam 40 indicates the passage of light through the system. The coherent light source 20 illuminates the input film 30 to be processed. The lens 22 produces, in its back focal plane, a two-dimensional Fourier transform of the information on the input film 30. The spatial filter 26, selected to perform the desired operation on the Fourier spectrum, is located in the back focal plane of the lens 22. The second lens 24 produces the inverse Fourier transform of the filtered light signal, and produces the filtered output image on the previously unexposed output film in the camera 34. The camera 34 is used to control exposure of the output film only, and the output film itself lies in the back focal plane of the second lens 24. The focal length of both lenses 22 and 24 is $f$. The relative spacing of the optical elements 30, 22, 26, 24 and 34, along the optic axis of the system, is indicated by units of $f$ to be an afocal arrangement with overall magnification M of one, and producing an inverted image in the back focal plane of the second lens 24. If the input film 30 is moved in a direction perpendicular to the optic axis of such an afocal system, the image moves in the opposite direction in the back focal plane of the second lens 24.

The translation tables, shown generally at 36 and 38, are part of the optical noise suppression device shown generally at 12. The translation table at 36 includes a carriage 36a, ways 36b, and a micrometer screw drive 36c. The screw drive 36c is appropriately linked, in standard fashon (not visible), to the carriage 36a so that a rotation of the screw drive in one sense causes the carriage to translate in one direction along the ways 36b, and rotation of the screw drive in the opposite sense causes the carriage to translate in the opposite direction. The ways 36b constrain the motion of the carriage 36a along a straight line. The translation table at 38 is identical to that at 36, and includes a carriage 38a, ways 38b, and a micrometer screw drive 38c. The two translation tables at 36 and 38 are aligned so that their respective ways 36b and 38b, and therefore the paths travelled by their respective carriages 36a and 38a, are parallel to each other, and perpendicular to the optic axis of the optical system at 10.

The screw drive 36c is connected to a right-angle gear box 42, and the screw drive 38c is connected to an identical right-angle gear box 44. A motor 46 is connected to the gear boxes 42 and 44 through a drive shaft assembly shown generally at 41 composed primarily of shafts and gears. The motor 46 selectively turns a drive shaft 48 which passes through, and is linked to, the gear box 42. A bearing mount 50 constrains and supports the end of the drive shaft 48, which is fitted with a gear 52. The gear 52 is meshed with an identical gear 54, mounted on a shaft 56 which is held parallel to the drive shaft 48 by two bearing mounts 58 and 60. The shaft 56 is linked to the gear box 44.

When the motor 46 is actuated, it rotates the drive shaft 48 in a given sense. The reverse gear train comprising the gears 52 and 54 transfers the rotational motion to the shaft 56 in the opposite sense. The rotating shaft 48 operates through the gear box 42 to turn the screw drive 36c advancing the carriage 36a in one direction while the rotating shaft 56 operates through the gear box 44 to turn the screw drive 38c advancing the carriage 38a in the direction opposite that of the carriage 36a. Since the gears 52 and 54 are identical, their gear ratio is one. Therefore, the motor 46 causes the carriage 36a to move in one direction perpendicular to the optic axis of the optical system at 10, and simultaneously causes the carriage 38a to move in the opposite direction, with both carriages moving at the same speed. If the direction of operation of the motor 46 is reversed, the two carriages 36a and 38a reverse their respective translational motions.

The translation tables at 36 and 38 may be mounted, via their respective ways 36b and 38b, on the same optical bench or other appropriate equipment (not shown) as are the elements of the optical system at 10. The input film holder 32 is mounted by a post 62 on the carriage 36a, and moves with that carriage; the camera 34 is similarly mounted by a post 64 on the carriage 38a, and likewise moves with that carriage. The carriage 36a and the input film holder 32 are so positioned and oriented that when the motor 46 is effecting translational motion of that carriage, the input film 30 moves in the front focal plane of the lens 22, perpendicularly to the optic axis of the optical system at 10. Similarly, the carriage 38a and the camera 34 are so positioned and oriented that when the motor 46 is effecting translational motion of that carriage, the output film (not shown) in the camera moves in the back focal plane of the lens 24, perpendicularly to the optic axis of the optical system at 10.

With the operation of the motor 46 and the drive shaft assembly at 41, the resulting motions of the input 30 and output (not shown) films possess three features essential to the successful operation of the optical noise suppression device at 12, and to the practice of the noise suppression method of the present invention. First, the input film 30 remains flat in the front focal plane of the Fourier transform lens 22, the object plane; the output film (not shown) remains flat in the back focal plane of the inverse Fourier transform lens 24, the image plane. Consequently, the position of the Fourier spectrum at the spatial filter 26 never changes, and, therefore, the operation of the filter on the spectrum is not affected by the motion of the input and output films. Furthermore, the image produced by the second lens 24 is always in focus in the back focal plane of that lens.

Secondly, the input film 30 and the output film (not shown) move simultaneously along parallel paths. In the present application to an optical system producing an inverted image, these motions of the input 30 and output (not shown) films are in opposite directions along the parallel paths. As the input film 30 is made to move, say, from right to left across the front focal plane of the first lens 22, the image formed in the back focal plane of the second lens 24 moves from left to right across the back focal plane of the second lens 24. Therefore, by reversing the rotation of the shaft 56 compared to the rotation of the drive shaft 48, using the gears 52 and 54, the output film (not shown) is made to move in the plane of the image in the same direction as the image there moves. In applications of the present invention to optical systems producing erect images, the image at the camera 34 moves in the same direction as the moving input film 30. Therefore, in such a case, the shaft 56 is made to rotate in the same direction as the drive shaft 48 to move the camera 34 in the same direction as the input film 30 is made to move.

Finally, the translational speeds of the input film 30 and the output film (not shown) are synchronized and tied to the overall magnification M of the optical system at 10. The ratio of the translational speed of the camera 34 to the translational speed of the input film 30 is the same as the inverse of the gear ratio of the gears 52 and 54. In the embodiment presented herein, that gear ratio is unity. For every point on the input film 30, acting as an object, there is a corresponding position in the image in the back focal plane of the second lens 24. As the input film 30 is moved in one direction by the translation table at 36, each of the points in the image, corresponding to positions in the input film, move at a speed equal to the translational speed of the input film multiplied by the magnification M of the optical system; and all the image points move at the same speed. Consequently, since, in the present case, M is unity, the same as the gear ratio, the output film (not shown) moves across the back focal plane of the second lens 24 at the same speed as the image moves across that same plane. Therefore, the image and the output film (not shown) are always stationary with respect to each other. To use the optical noise suppression device at 12 with an optical system of magnification M that is different from unity, the ratio of the gears 52 and 54 must be changed accordingly. In all cases, the linking gear ratio between the shafts 48 and 56 must be equal to the inverse of the magnification M of the optical system. In the particular cases where the image at the camera 34 moves in the opposite direction from the direction of motion of the input film 30, such as the present case, the gear linkage between the shafts 48 and 56 must also cause the shafts to rotate in opposite directions.

It will be appreciated that all three essential features of the motion of the input film 30 and of the output film (not shown) may be achieved by using variations of the drive shaft assembly at 41, modifications in the translation tables at 36 and 38, modifications in the gear boxes 42 and 44, or combinations thereof, without departing from the invention. For example, the motor 46 could be linked directly to the shaft 56 rather than the shaft 48. Another possibility is to use one shaft 48 connected to both gear boxes 42 and 44, and to either modify the gear boxes or modify the screw drives 36c and 38c to obtain the needed ratio and reversal characteristics. The motor 46 may also be placed on a line with and between the translation tables at 36 and 38, with a drive shaft extending in both directions from the motor and tied to appropriate screw drives pointing from the respective translation tables directly at the motor. Still another method of achieving the same three characteristics of the motions of the input 30 and output (not shown) films involves operating each translation table by a separate motor, with the two motors synchronized electronically or otherwise.

The present invention may be used with variations of the standard afocal coherent light optical system as disclosed herein. An example of such a system occurs where an additional lens is used to magnify the Fourier spectrum before the second lens 24 performs the inverse Fourier transformation. In some systems, the image in the back focal plane of the inverse Fourier transform lens moves in the same direction as the input device 30 moving perpendicularly to the optic axis. Then, the reversal feature of the linking gear assembly is not included in the optical noise suppression device. However, it is always true that the linking gear ratio must be equal to the inverse of the overall magnification M of the optical system between the input device and the output device. In particular, where the magnification M is unity, and the image in the back focal plane of the second lens 24 moves in the same direction as the input device 30, the shafts 48 and 56 must rotate in the same direction and at the same speed, and hence, may actually be the same shaft. Actually, in such a case, where the dimensions of the equipment and the value of $f$ permit it, both the input device 30 and the camera 34 may be located on the same translation device.

To use the optical noise suppression device at 12, the motor 46 is first actuated with the shutter (not shown) of the camera 34 closed to give the motor time to get the carriages 36a and 38a up to constant speeds. Then, the shutter is opened to expose the output film. When the shutter is closed, the motor may be stopped, or reversed to return the carriages 36a and 38a to their original positions. All of these steps may be initiated automatically by pre-set electronic equipment, or other appropriate control devices (not shown).

The suppression of the optical noise due to noise sources present on and within the elements of the optical system is due to the motion of the output film with respect to the stationary noise pattern, resulting in the noise pattern at the output film averaging out with time. Consequently, increasing the speed of the input film and the output film, or decreasing the exposure time of the output film, increases the degree of noise suppression. In practice, for an exposure time of less than one second, a carriage speed resulting in a few millimeters travel of the input and output films will effectively suppress the noise in an optical system using coherent light and optical elements of high cosmetic quality.

It will be appreciated that the method of the present invention effectively suppresses the noise from all the optical elements between the input device and the output device with the use of a single noise suppression device such as that shown at 12.

The apparatus of the present invention is inexpensive, and made from readily available standard components. The proper positioning of the film holders 32 and 34 on the carriages 36a and 38a respectively, and the alignments of the ways 36b and 38b, are readily achieved compared to highly critical and difficult alignments required in the prior art.

The present method and apparatus may be applied to an existing optical system, and will result in optical noise suppression whether the light used in the optical system is highly coherent or virtually incoherent, although it will be appreciated that the need for optical noise suppression diminishes as the light source used becomes incoherent.

The foregoing disclosure and description of the invention is illustrative and explanatory thereof, and various changes in the method as well as in the details of the illustrated apparatus may be made within the scope of the appended claims without departing from the spirit of the invention.

I claim:

1. An optical noise suppressor, in combination with an optical system including along its optic axis an input device and an output device, comprising:
   a. first translation means for selectively moving said input device perpendicularly with respect to said optic axis;
   b. second translation means for selectively moving said output device perpendicularly with respect to said optic axis; and
   c. synchronizing means for selectively causing said first translation means and said second translation means to move said input device and said output device respectively simultaneously along parallel paths perpendicular to said optic axis.

2. An optical noise suppressor as defined in claim 1 wherein said synchronizing means comprises power means for effecting said motions by said first translation means and said second translation means.

3. An optical noise suppressor as defined in claim 2 further comprising shaft assembly means for transferring motion from said power means to said first translation means and to said second translation means.

4. An optical noise suppressor as defined in claim 3 further comprising:
   a. first gear means linking said shaft assembly means to said first translation means; and
   b. second gear means linking said shaft assembly means to said second translation means.

5. An optical noise suppressor as defined in claim 2 wherein said synchronizing means further comprises automatic control means for selectively actuating said power means.

6. An optical noise suppressor as defined in claim 4 wherein said synchronizing means further comprises automatic control means for selectively actuating said power means.

7. An optical noise suppressor as defined in claim 2 further comprising:
   a. said first translation means comprising:
      i. first carriage means on which is mounted said input device;
      ii. first ways means for guiding said first carriage means;
      iii. first screw drive means for propelling said first carriage means; and
   b. said second translation means comprising:
      i. second carriage means on which is mounted said output device;
      ii. second ways means for guiding said second carriage means; and
      iii. second screw drive means for propelling said second carriage means.

8. An optical noise suppressor as defined in claim 7 further comprising:
   a. first shaft means for transferring rotary motion from said power means to said first screw drive means; and
   b. second shaft means for transferring rotary motion from said power means to said second screw drive means.

9. An optical noise suppressor as defined in claim 8 further comprising:
   a. first gear box means linking said first shaft means to said first screw drive means; and
   b. second gear box means linking said second shaft means to said second screw drive means.

10. An optical noise suppressor as defined in claim 8 wherein said synchronizing means further comprises gear train means linking said first shaft means and said second shaft means to effect said simultaneous motions by said first translation means and said second translation means.

11. An optical noise suppressor as defined in claim 4 wherein said synchronizing means further comprises gear train means to effect said simultaneous motions by said second translation means and said first translation means.

12. An optical noise suppressor as defined in claim 10 wherein said synchronizing means further comprises automatic control means for selectively actuating said power means.

13. An optical noise suppressor for averaging out optical noise, in combination with a coherent light optical system which includes along its optic axis a spatial filter, an input device in an object plane, and an output device for recording light in an image plane, comprising:
 a. input carriage means on which is mounted said input device in said object plane;
 b. input ways means for constraining said input carriage means to confine said input device to said object plane while permitting said input carriage means to move said input device perpendicularly to said optic axis;
 c. input screw drive means for propelling said input carriage means;
 d. output carriage means on which is mounted said output device in said image plane;
 e. output ways means for constraining said output carriage means to confine said output device to said image plane while permitting said output carriage means to move said output device perpendicularly to said optic axis;
 f. output screw drive means for propelling said output carriage means; and
 g. power means equipped wih drive shaft assembly means for selectively causing simultaneous rotary motion of said input screw drive means and said output screw drive means to propel said input carriage means and said output carriage means so as to simultaneously move said input device and said output device along parallel paths perpendicular to said optic axis.

14. An optical noise suppressor as defined in claim 13 wherein said drive shaft assembly means comprises:
 a. rotatable first shaft means linked to said input screw drive means;
 b. rotatable second shaft means linked to said output screw drive means; and
 c. gear train means linking said first shaft means and said second shaft means for simultaneous rotational motion of said first shaft means and second shaft means when said drive shaft assembly means is actuated by said power means.

15. An optical noise suppressor as defined in claim 14 further comprising:
 a. input gear box means for transferring rotary motion from said first shaft means to said input screw drive means; and
 b. output gear box means for transferring rotary motion from said second shaft means to said output screw drive means.

16. An optical noise suppressor as defined in claim 13 further comprising automatic control means to actuate said power means to cause said input device and said output device to be in said respective motions when said output device is actuated to record light in said optical system.

17. An optical noise suppressor as defined in claim 15 further comprising automatic control means to actuate said power means to cause said input device and said output device to be in said respective motions when said output device is actuated to record light in said optical system.

18. An optical noise suppressor as defined in claim 13 wherein the ratio of the speed of said output device motion to the speed of said input device motion is equal to the overall magnification of said optical system.

19. An optical noise suppressor as defined in claim 15 wherein said gear train means has an overall gear ratio equal to the inverse of the overall magnification of said optical system so as to constrain said motion of said output device to be at the same speed as the motion, in the image plane, of the image of said optical system caused by said motion of said input device.

20. A method of suppressing optical noise in an optical system, wherein an output device is detecting information from an input device by way of said optical system, comprising the steps of:
 a. moving said input device perpendicularly to the optic axis of the optical system;
 b. simultaneously moving said output device along a path parallel to that of the movement of said input device; and
 c. synchronizing said motions of said input device and said output device so that the ratio of the speed of said output device to the speed of said input device is equal to the overall magnification of the optical system.

21. A method of suppressing optical noise as defined in claim 20 further comprising the steps of:
 a. constraining said motion of said input device to the object plane of the optical system; and
 b. constraining said motion of said output device to the image plane of the optical system.

22. A method of suppressing optical noise as defined in claim 20 further comprising the step of effecting said motions of said input device and said output device by automatic power means.

23. A method of suppressing optical noise as defined in claim 20 further comprising the step of effecting said simultaneous movement of said input device and said output device in opposite directions along said parallel paths.

* * * * *